Sept. 8, 1942.                     D. G. LITTLE                     2,295,412
                              RADIO DIRECTION FINDER
                                Filed Jan. 26, 1940

WITNESSES:                                            INVENTOR
                                                   Donald G. Little.
                                                   BY
                                                      ATTORNEY Patented Sept. 8, 1942

2,295,412

UNITED STATES PATENT OFFICE 2,295,412

RADIO DIRECTION FINDER

Donald G. Little, Baltimore, Md., assignor to Westinghouse Electric & Manufacturing Company, East Pittsburgh, Pa., a corporation of Pennsylvania Application January 26, 1940, Serial No. 315,693

5 Claims. (Cl. 250—11)

This invention relates to radio direction finding systems and more particularly to systems utilizing the balancer antenna and loop method. The primary object of this invention is to visually indicate the direction of a radio signal intercepted by the above type of direction finding system under various conditions of distance and direction of a mobile receiver or transmitter.

A further object of this invention is to utilize cathode-rays for effecting an indication of the direction of a radio wave.

Another object of this invention is to coordinate various components of a radio direction finding system in a simple arrangement in such manner as to energize a cathode-ray tube to form a distinct pattern on the screen thereof whereby a change in the direction of the received signal may readily be observed.

A particular feature of the invention is that means are provided whereby the reference point of the indicator may easily be coordinated with calibrations on the screen of the cathode ray tube.

Other objects and advantages will be apparent from the following description of the invention, pointed out in particularity by the appended claims and taken in connection with the accompanying drawing in which:

Among the various methods of indicating the direction of a radio wave, the system employing a rotatable loop and a balancer antenna has found many applications. The directional characteristic of a loop antenna is well known in the art and is used in various applications where bearings as to direction are to be taken. The duo-lateral directional characteristic of the loop antenna, that is that both sides of the loop are equally sensitive to the signal can be overcome in the receiving system by employing a vertical or other suitable radiator having non-directional characteristics. If the radio frequency voltage appearing across the loop terminals is vectorially combined with the radio frequency voltage delivered by the vertical antenna tuned to the same signal as the loop, the resulting directional characteristic will be a form of cardioid. Direction finding systems operating on this principle are well known in the art and need not be described in great detail, inasmuch as the invention is directed to a novel arrangement for visually indicating the effect of the combined voltages, hence, also, the direction of the signal. To this end, a cathode-ray tube is utilized which in combination with the various components of the system herein shown functions in such manner as to trace a characteristic pattern on the screen of the tube which distinctly indicates the position of minimum signal.

By the use of this invention, several advantages are gained over methods heretofore used for indicating minimum signal intensity. The indication in the system herein described is visual and continuous. The confusing effect of static and interference is more easily discounted than in oral methods of reception and direction finding. The system herein described utilizes also the "zero signal" method which is the most accurate due to the shape of the cardioid curve. Furthermore, it indicates continuously that the signal is being received, thus avoiding the unreliability of the usual zero signal methods. The zero signal indicating point is also unaffected by modulation of the signal. In this manner a broadcasting station, as well as a regular beacon transmitter may be received and its direction indicated.

Figure 1:
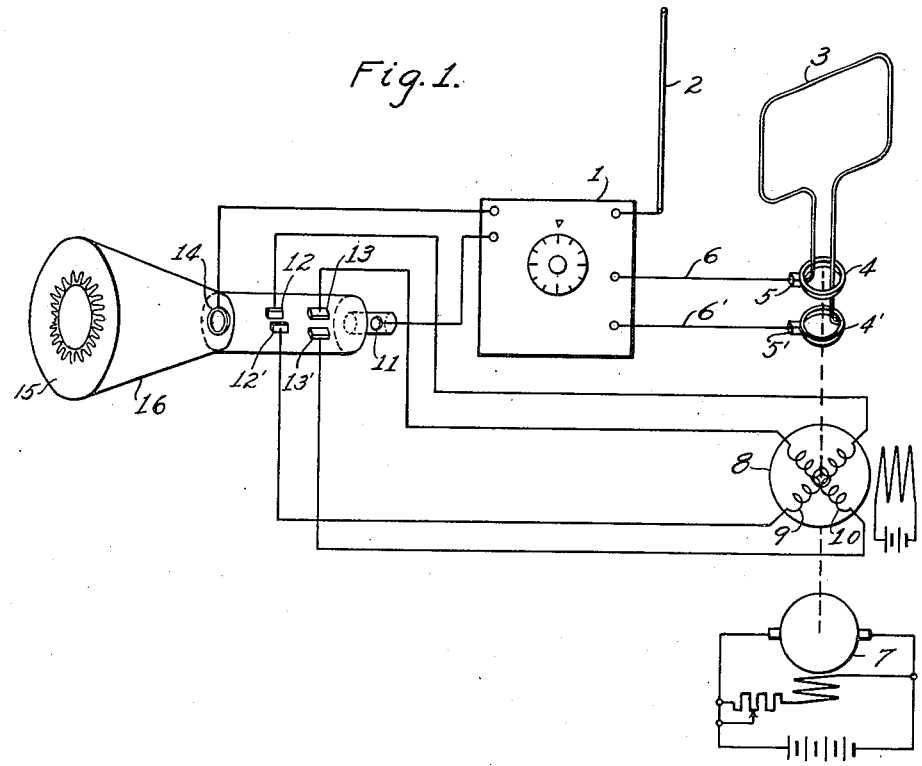
Figure 1 is a schematic diagram of the circuit elements of the system.

Referring to the drawing, Figure 1, the radio receiver 1 indicated schematically by a rectangle has dual-input channels, one of which is connected to an antenna 2, and the other to the terminals of a loop 3 by means of collector rings 4, and 4', brushes 5 and 5', and leads 6 and 6', respectively. The loop 3 is rotatable, as indicated by the dotted line terminating in a suitable mechanism such as a suitable motor 7. In common with the rotating means of the loop is provided an alternator 8 having rotor windings 9 and 10 which are so coordinated that the voltage between the terminals of each winding is displaced in phase quadrature. In other words, there is a 90° phase displacement between the two output voltages. A cathode-ray tube 16 is schematically shown here as to its principal internal structure for guiding the rays emitted from its cathode 11. Cathode-ray tubes are widely used in various electrical systems and radio applications, and there are several types and forms commercially available. For the sake of brevity, it is believed that the internal construction and principle of operation of these tubes need not be given here. Suffice it to say that only a slight modification is necessary for adapting the usual cathode-ray tube for the purpose herein intended.

In addition to the ray deflector means comprising deflector plates 12 and 12', 13 and 13', by which horizontal and vertical deflection of the rays can be effected, there is provided an additional annular shaped electrode 14 and so positioned that the rays striking the screen 15 will go through the electrode 14. The effect of this additional electrode when properly energized will be a modulation of the rays and shall be described more fully when explaining the operation of the system.

The two sets of deflecting plates 12 and 12' and 13 and 13' are each connected to one of the windings of the alternator. In this manner, for example, the winding 9 supplies an alternating voltage between the plates 12 and 12', whereas the winding 10 supplies an alternating voltage 90° displaced in phase with respect to the former between plates 13 and 13'.

Figure 2:
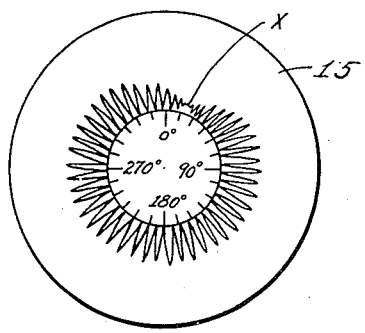
Fig. 2 is the picture of the pattern on the cathode-ray tube screen with reference to a calibrated division of the screen itself.

Describing the operation of the system, the loop 3 is caused to rotate in synchronism with the generator 8 at a speed which, in order to give an example, may be 500 R. P. M. The effect of the generator voltage on the deflecting plates of the cathode-ray tube will be the production of a circular pattern since there is a phase displacement of 90° between the two sets of deflecting plates. As long as there is no signal received by the loop and the antenna, this pattern remains unaffected. When the radio receiver is properly tuned to receive a signal, the amplified signal voltage of both input channels is applied between the cathode 11 and electrode 14 of the cathode-ray tube. The voltage of the electrode 14 will be at radio frequency which is much higher than the frequency of the alternator. The result will be the widening of the circular pattern in the form of a solid band ring of the screen, as shown in Fig. 2, except at one point marked (X) when no voltage will be impressed on the electrode 14. Now, by placing a compass scale, as shown also in Fig. 2 on the screen of the cathode-ray tube, and adjusting the scale on the angular position of the alternator 8 with respect to the loop antenna 3, the minimum point of signal reception may be placed at a point adjacent to the scale indicating the proper direction of the incoming signal.

Figure 3:
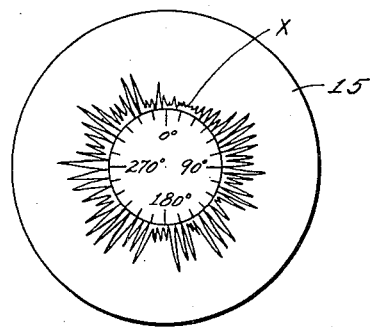
Fig. 3 shows the effect of signal modulation of the received wave with respect to the form of the pattern on the screen of the tube.

When the transmitter carrier wave is also modulated the radio frequency variation will be shown by radial contraction and expansion of the outer band of the circular pattern. This is shown in Fig. 3. It is to be noted that although the modulation will cause marked variations in the circular trace, the minimum signal will remain clearly indicated, as shown by (X) and can easily be read with reference to the scale provided on the screen.

Various means may be provided for obtaining a constant frequency source for energizing the deflecting plates. It may be, for example, a single phase alternator and the phase displacement obtained by capacity and inductance networks known in the art. Radio receivers of various types may also be used. A superheterodyne circuit can be employed and the intermediate frequency voltage may be applied to the electrode 14. The receiver may also include automatic volume control or limiting means to keep the output within limits and thereby sharpen the indication of zero signal reception. A constant voltage device may also be employed by the alternator 8 and the deflector plates of the tube 16 in order to maintain the radius of the circular trace constant as the rotational speed of the alternator varies due to imperfect driving means, for instance, when a synchronous motor cannot be used.

The invention, therefore, is not limited to the particular components indicated here but may be assembled in various other forms to obtain the desired result without departing from the invention.

I claim as my invention:

1. In a system for indicating the direction of a carrier wave, a carrier wave receiver having dual input channels, an output circuit for said receiver, an antenna connected to one of said channels and a loop antenna to the second of said channels, means for rotating said loop antenna at uniform speed whereby reception of said wave over said second channel periodically and continuously varies from maximum to minimum signal intensity, a cathode-ray tube having horizontal and vertical deflecting elements, a cathode, a screen and an auxiliary annular shaped electrode for controlling the movement of the cathode-ray, means for continuously projecting the cathode ray on said screen, means synchronously operable with said rotating means for producing alternating voltages in phase quadrature, circuit means for impressing said voltages upon said deflecting elements, respectively, whereby said cathode-ray produces a circular trace pattern on said screen and circuit means connecting the output of said receiver between said cathode and said auxiliary electrode causing thereby modulation of said pattern in accordance with the signal intensity received from both of said channels.

2. In a radio direction indicator, receiving means for high frequency carrier waves, dual input for said means including a loop antenna and a balancer antenna, circuit means for vectorially combining the signal voltages of both said inputs, means for rotating said loop at a predetermined uniform speed, a cathode-ray tube having principal electrodes for producing, focusing and deflecting cathode-rays upon a fluorescent screen, said principal electrodes being continuously energized to project said cathode ray on said screen continuously, means interconnected with said rotating loop for deflecting said rays to form a circular pattern of a predetermined diameter, an auxiliary control annular shaped electrode for said tube for altering the radial expansion of said trace upon energization and circuit means for impressing between said cathode and said auxiliary electrode the combined signal voltage output of said receiving means.

3. In a radio direction indicator, receiving means for high frequency carrier waves, dual input for said means including a loop antenna and a balancer antenna, circuit means for vectorially combining the signal voltages of both said inputs, means for rotating said loop at a predetermined uniform speed, a cathode-ray tube having principal electrodes for producing, focusing and deflecting cathode-rays upon a fluorescent screen, said electrodes being continuously energized to project said cathode ray on said screen continuously, means interconnected with said rotating loop for deflecting said rays to form a circular pattern of a predetermined diameter, an auxiliary annular shaped control electrode exceeding in diameter said pattern for said tube for altering the radial expansion of said trace in accordance with the amplitude of received signals upon energization and circuit means for supplying to said auxiliary electrode and said cathode the combined signal voltage from said receiving means, a scale upon said tube cooperating with said pattern and control means for changing the relative angular position of said loop with respect to said deflecting means whereby to correlate the portion of minimum radial indication of said pattern with desired markings of said scale.

4. In a system for visually indicating the magnitude and phase relationship of electrical currents, a source of current to be indicated, a cathode ray tube having principal electrodes for producing and directing a beam of cathode rays upon a screen, said electrodes being continuously energized to project a continuous beam on said screen, means for deflecting said beam radially with respect to the center of said screen at a uniform rate in a circular path, and an auxiliary ring-shaped electrode positioned within said tube between said deflecting means and said screen, said electrode having a diameter larger than that of said circular path, and concentric therewith, circuit means for connecting said source between said auxiliary electrode and one of said principal electrodes.

5. In combination with a source of modulated carrier waves, an electron tube having a fluorescent screen and means for continuously projecting an electron beam into incidence thereon, means for causing the point of incidence of said beam on said screen to describe a substantially circular path, an annular electrode surrounding the path of said beam between said causing means and said screen, and means for impressing said modulated carrier wave between said annular electrode and said means for producing an electron beam.

DONALD G. LITTLE.